Oct. 9, 1956 J. L. GEAR 2,766,434
QUICKLY ATTACHABLE MOUNT FOR ELECTRICAL FIXTURES
Filed June 14, 1955 2 Sheets-Sheet 1
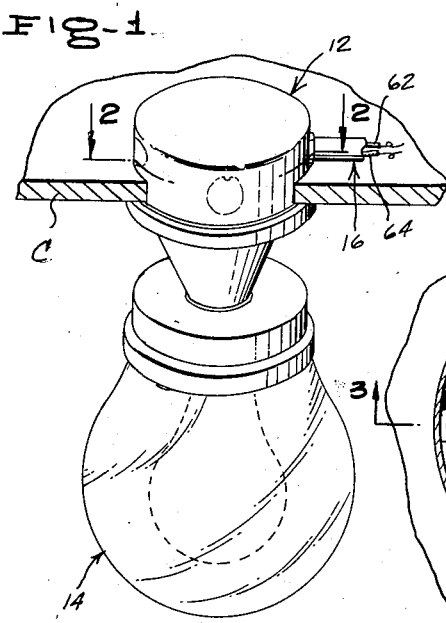
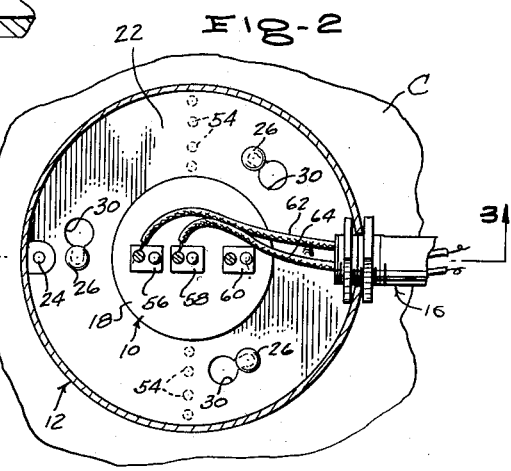
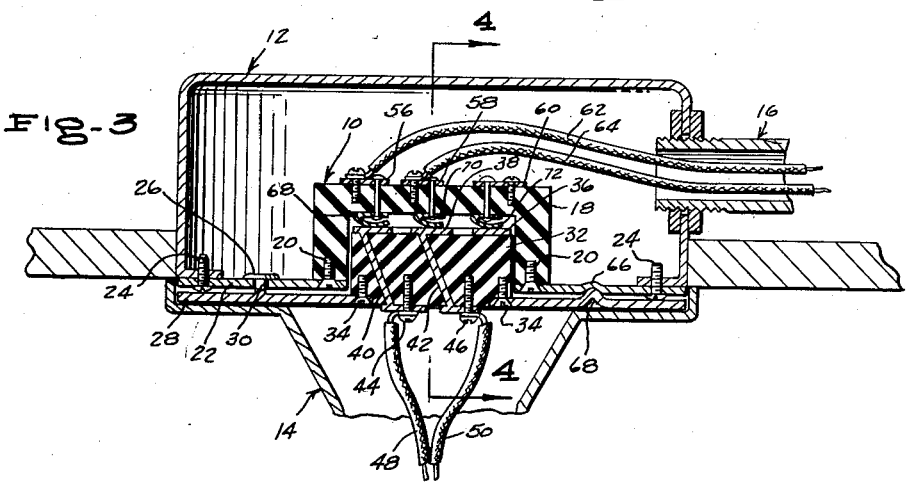
INVENTOR.
JAMES L. GEAR
BY
McMorrow, Berman + Davidson
ATTORNEYS

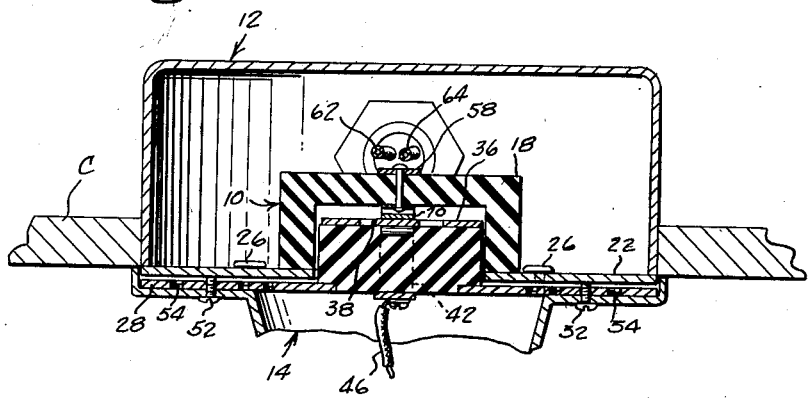
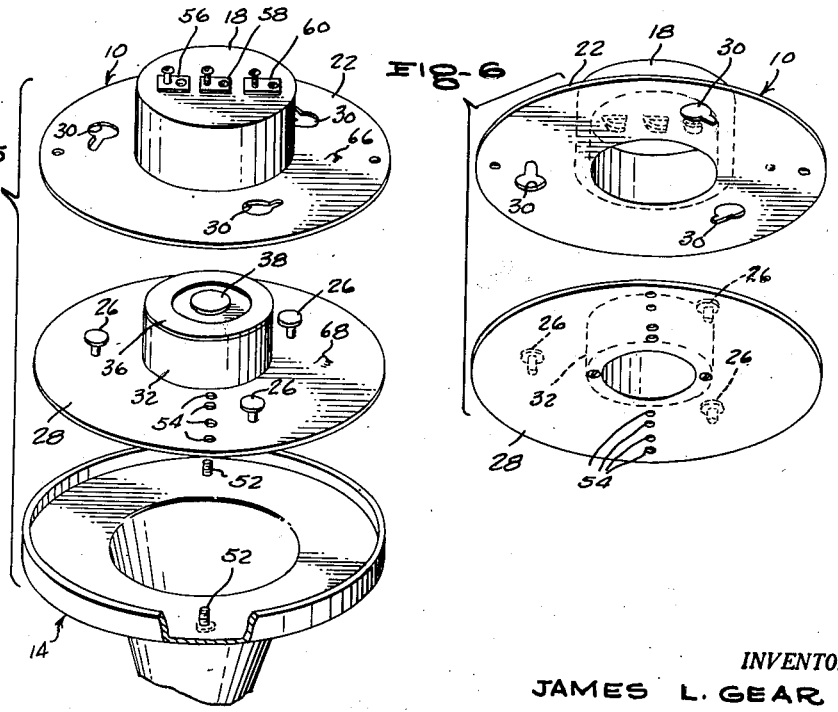

United States Patent Office 2,766,434
Patented Oct. 9, 1956

2,766,434

QUICKLY ATTACHABLE MOUNT FOR ELECTRICAL FIXTURES

James L. Gear, Elberta, Mich.

Application June 14, 1955, Serial No. 515,269

2 Claims. (Cl. 339—122)

This invention is a means for attaching an electrical fixture to a ceiling or wall outlet box, in a manner that will make a proper electrical connection between the fixture and the house power supply while still permitting removal of the fixture with minimum difficulty and loss of time, whenever desired.

Ordinarily, a fixture in being mounted on a ceiling or wall must have its leads properly connected to the leads within the outlet box, after which the fixture must be secured to an associated support so as to be held in place.

Among objects of the present invention are to provide a generally improved fixture mount of the separable type; facilitate the separation or connection of the component parts of the device; facilitate the detachment of the fixture without danger whenever it is to be cleaned or replaced; and permit the fixture to be connected to the device consitituting the invention, and said device to be connected to the outlet box, without danger from electrical shocks, etc.

Other objects and advantages will be apparent from the following description, the claims appended thereto, and from the annexed drawings in which like reference characters designate like parts throughout the several views and wherein:

Figure 1 is a perspective view of the device in use with a fixture and outlet box;

Figure 2 is an enlarged section on line 2—2 of Figure 1;

Figure 3 is a section, still further enlarged, on line 3—3 of Figure 2;

Figure 4 is a section on the same scale as Figure 3, on line 4—4 of Figure 3;

Figure 5 is an exploded perspective view of the device seen from above; and

Figure 6 is an exploded, bottom perspective view of the device.

The fixture mount 10 constituting the present invention is shown in association with a conventional electrical outlet box 12 and electrical fixture 14. A conduit for a power supply cable 16 enters the outlet box at the side thereof.

An electrically insulative main block 18, of inverted cup shape to form therein a downwardly opening center recess, is secured by diametrically opposed screws 20 to a flat, circular base plate 22 having a center opening communicating with the recess of block 18, and connected by screws 24 to the conventional outlet box 12.

Headed lugs 26, angularly spaced 120 degrees apart upon the marginal portion of a flat fixture-connecting plate 28, are engageable in keyhole slots 30 of base plate 22. A block 32 of electrically insulative material has a depending boss on its underside engaging in a center opening of plate 28, and is secured to plate 28 by diametrically opposed screws 34.

Electrically conductive contact elements 36, 38 (Figure 5) respectively formed as a concentrically related ring and circular disc, are integrally provided with depending tongues 40, 42 embedded in block 32 and having bottom portions overlying the underside of block 32. Screws 34 are threaded in said bottom portions, and connect to the tongues the leads 48 and 50 of the electrical fixture.

The fixture (Figure 5) as is usual has diametrically opposed projecting screws 52, and these are threadedly engageable in any selected openings 54 of a diametrically aligned row of openings formed in base plate 28, to accommodate the device to fixtures of different sizes or makes.

When plate 28 is connected to the fixture, it can thereafter remain on the fixture permanently.

Spaced, diametrically aligned contact plates 56, 58, 60 overlying the main block 18, are selectively connectable to power leads 62, 64. The rivets that connect plates 56, 58, 60 to block 18 pass into the center recess of the block, and secure to the bottom wall of said recess spring contacts 68, 70, 72. The contact 70 makes contact with the center disc 38, and contacts 68, 72 engage the ring 36.

To interlock the plates 22, 28 against relative rotation, complementary detents or nodes 66, 68 are formed thereon interengaging in the slot-engaged positions of headed lugs 26.

In use, the main block and base plate 22 are secured to the outlet box, and a suitable electrical connection to the leads 62, 64 is made at this time. The plate 28 is secured to the fixture, with a suitable electrical connection being made between leads 48 and 50 and the contacts of the block 32. Then, by detachably interconnecting the plates 22, 28, an electrical connection for the fixture is made.

At such time as it may be desired to remove the fixture for cleaning, repair, or the like, it is merely necessary to partially rotate it to a slight extent, to disengage the detents 66, 68 and shift the headed lugs 26 into the larger ends of the slots 30. The entire fixture can be now detached, for any desired purpose, and when reattached, will once more be electrically connected, ready for use.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A quickly detachable electrical fixture mount for connecting an electrical fixture to an outlet box, comprising: a pair of flat, thin plates one including circumferentially spaced, headed lugs and the other having correspondingly spaced keyhole slots receiving the lugs to provide a quickly made, readily separable connection between the plates on relative rotation of the plates about a common axis, said plates when connected lying in face-to-face contact, one plate being adapted for fixed detachable connection to an outlet box in a position in which it will constitute a cover plate for the box and the other being adapted for fixed, detachable connection to an electrical fixture in position covering the box-adjacent end of the fixture; electrically insulative female and male blocks rigid with the respective plates and mating on connection of the plates to each other, said blocks respectively including contacts engaging one another in the connected relationship of the plates, said blocks being mounted on corresponding faces of the respective plates and projecting out of the planes of their associated plates in the same direction; and binding screws on the respective blocks having electrical connections to the contacts thereof, the screws of the block of said one plate being adapted for removably binding to its associated contacts leads extending into the outlet box from a source of electricity, and the screws of the other block being correspondingly adapted to removably bind to its associated contacts leads extending within the said end of the fixture, the binding screws of the block of the other plate including lead-engaging heads projecting from the plane of said other plate in a direction opposite from that in which the blocks extend, whereby said blocks may both be confined within the outlet box on covering of the box by said one plate, with the binding screws of the block of said other plate projecting into said end of the fixture and said end of the fixture lying flat against the covered outlet box.

2. A quickly detachable electrical fixture mount for connecting an electrical fixture to an outlet box, comprising: a pair of flat, thin plates one including circumferentially spaced, headed lugs and the other having correspondingly spaced keyhole slots receiving the lugs to provide a quickly made, readily separable connection between the plates on relative rotation of the plates about a common axis, said plates when connected lying in face-to-face contact, one plate being adapted for fixed detachable connection to an outlet box in a position in which it will constitute a cover plate for the box and the other being adapted for fixed, detachable connection to an electrical fixture in position covering the box-adjacent end of the fixture; electrically insulative female and male blocks rigid with the respective plates and mating on connection of the plates to each other, said blocks respectively including contacts engaging one another in the connected relationship of the plates, said blocks being mounted on corresponding faces of the respective plates and projecting out of the planes of their associated plates in the same direction; and binding screws on the respective blocks having electrical connections to the contacts thereof, the screws of the block of said one plate being adapted for removably binding to its associated contacts leads extending into the outlet box from a source of electricity, and the screws of the other block being correspondingly adapted to removably bind to its associated contacts leads extending within the fixture to said end of the fixture, the contacts of the block of said one plate being formed as springs one located on said axis and at least one other spring spaced from said one spring, the contacts of the block of said other plate being formed one as a disc centered on said axis to engage said one spring and the other as a ring concentric with the plates and engaging the other spring.

References Cited in the file of this patent

UNITED STATES PATENTS

| | | |
|---|---|---|
| 1,486,896 | Hubbell | Mar. 18, 1924 |
| 1,536,322 | Benjamin | May 5, 1925 |
| 1,592,344 | De Reamer | July 13, 1926 |
| 2,129,914 | Davis | Sept. 13, 1938 |
| 2,715,214 | Appleton | Aug. 9, 1955 |

FOREIGN PATENTS

| | | |
|---|---|---|
| 577,522 | Great Britain | May 21, 1946 |